US012676416B1

(12) United States Patent
Lee et al.

(10) Patent No.: US 12,676,416 B1
(45) Date of Patent: Jul. 7, 2026

(54) IMPEDANCE TUNABLE FOLDED DIPOLE ANTENNA

(71) Applicant: CAES Systems LLC, Arlington, VA (US)

(72) Inventors: Yong Jae Lee, Blue Bell, PA (US); Timothy James White, Oreland, PA (US); Michael A. Matsick, Coopersburg, PA (US)

(73) Assignee: CAES Systems LLC, Arlington, VA (US)

( * ) Notice: Subject to any disclaimer, the term of this patent is extended or adjusted under 35 U.S.C. 154(b) by 126 days.

(21) Appl. No.: 18/633,951

(22) Filed: Apr. 12, 2024

(51) Int. Cl.
*H01Q 9/26* (2006.01)
*H01Q 9/04* (2006.01)

(52) U.S. Cl.
CPC ............. *H01Q 9/26* (2013.01); *H01Q 9/0442* (2013.01)

(58) Field of Classification Search
CPC ................................ H01Q 9/26; H01Q 9/0442
See application file for complete search history.

(56) References Cited

U.S. PATENT DOCUMENTS 4,005,430 A * 1/1977 Dubost .................... H01Q 9/26 343/807
2004/0070548 A1* 4/2004 Cake ...................... H01Q 5/371 343/803
2015/0295320 A1* 10/2015 Lee .......................... H01Q 9/26 324/322
2016/0226156 A1* 8/2016 So ........................ H01Q 9/0421
2020/0127383 A1* 4/2020 Patton ....................... H01Q 1/38
2020/0136258 A1* 4/2020 Patton .................... H01Q 9/285
2024/0313408 A1* 9/2024 Hussain .................. H01Q 5/35
2025/0286281 A1* 9/2025 Jargalsaikhan ........ H01Q 15/14

FOREIGN PATENT DOCUMENTS

CA 3057782 C * 3/2022 ............. H01Q 1/246
CN 109286065 A * 1/2019 ............... H01Q 1/36

* cited by examiner

*Primary Examiner* — Seokjin Kim
(74) *Attorney, Agent, or Firm* — Alston & Bird LLP

(57) ABSTRACT

Apparatuses, systems, and methods for a folded dipole antenna are provided. A folded dipole antenna may include a radiating element with a first side and a second side and a RF feed. The first side of the radiating element may include a first portion, a second portion, and a first fold between this first portion and this second portion. The second side of the radiating element may include a first portion, a second portion, and a second fold between this first portion and this second portion. The first portion of the first side and the first portion of the second side have a first diameter that is different from the second portion of the first side and the second portion of the second side have a second diameter. The folded dipole antenna may also include one or more tuning bars.

20 Claims, 6 Drawing Sheets

600A

IMPEDANCE TUNABLE FOLDED DIPOLE ANTENNA

TECHNOLOGICAL FIELD

Example embodiments of the present disclosure relate generally to apparatuses, systems, and methods for dipole antennas, particularly folded dipole antennas.

BACKGROUND

Dipole antennas may be used to transmit and receive signals at various frequencies. Dipole antennas may be used in multiple applications, including applications that limit, among other things, a size of a dipole antenna. Limitations on dipole antenna size may lead to multiple limitations, including lossy dipole antennas.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to dipole antennas.

In accordance with some embodiments of the present disclosure, an example folded dipole antenna is provided. The folded dipole antenna may comprise: a radiating element comprised of a first side and a second side; a RF feed located between the first side of the radiating element and the second side of the radiating element; wherein the first side of the radiating element is comprised of a first portion of the first side, a second portion of the first side, and a first fold between the first portion of the first side and the second portion of the first side; wherein the second side of the radiating element is comprised of a first portion of the second side, a second portion of the second side, and a second fold between the first portion of the second side and the second portion of the second side; wherein the first portion of the first side and the first portion of the second side have a first diameter, the second portion of the first side and the second portion of the second side have a second diameter, and the first diameter is different than the second diameter; a first tuning bar located between the first portion of the first side and the second portion of the first side; and a second tuning bar located between the first portion of the second side and the second portion of the second side.

In some embodiments, the first tuning bar is comprised of a first stub of the first tuning bar and a second stub of the first tuning bar separate by a first stub gap; and wherein second tuning bar is comprised of a first stub of the second tuning bar and a second stub of the second tuning bar separate by a second stub gap.

In some embodiments, the first stub of the first tuning bar and the second stub of the first tuning bar share an axis, and the first stub of the second tuning bar and the second stub of the second tuning bar share an axis.

In some embodiments, the first stub of the first tuning bar has a first central axis and the second stub of the first tuning bar has a second central axis, the first central axis being different than the second central axis.

In some embodiments, the first tuning bar is a solid tuning bar, and the second tuning bar is a solid tuning bar.

In some embodiments, the first tuning bar has a third diameter, the second tuning bar has a fourth diameter, and the third diameter is different than the fourth diameter.

In some embodiments, the first tuning bar is located a first distance from the first fold, the second tuning bar is located a second distance from the second fold, and wherein the first distance and the second distance are the same.

In some embodiments, the first tuning bar is located a first distance from the first fold, the second tuning bar is located a second distance from the second fold, and wherein the first distance and the second distance are different.

In some embodiments, the second portion of the first side of the radiating element is terminated with a first terminating impedance and the second portion of the second side is terminated with a second terminating impedance.

In some embodiments, the folded dipole antenna of comprises a third tuning bar.

In accordance with some embodiments of the present disclosure, a first example method is provided. This method may comprise: providing a folded dipole antenna, wherein the folded dipole antenna comprises: a radiating element comprised of a first side and a second side; a RF feed located between the first side of the radiating element and the second side of the radiating element; wherein the first side of the radiating element is comprised of a first portion of the first side, a second portion of the first side, and a first fold between the first portion of the first side and the second portion of the first side; wherein the second side of the radiating element is comprised of a first portion of the second side, a second portion of the second side, and a second fold between the first portion of the second side and the second portion of the second side; wherein the first portion of the first side and the first portion of the second side have a first diameter, the second portion of the first side and the second portion of the second side have a second diameter, and the first diameter is different than the second diameter; a first tuning bar located between the first portion of the first side and the second portion of the first side; a second tuning bar located between the first portion of the second side and the second portion of the second side; receiving a first signal via the RF feed; and generating a first electromagnetic signal with the folded dipole antenna based on the first signal.

In some embodiments, the first tuning bar is comprised of a first stub of the first tuning bar and a second stub of the first tuning bar separate by a first stub gap; and wherein second tuning bar is comprised of a first stub of the second tuning bar and a second stub of the second tuning bar separate by a second stub gap.

In some embodiments, the first tuning bar has a third diameter, the second tuning bar has a fourth diameter, and the third diameter is different than the fourth diameter.

In some embodiments, the first tuning bar is located a first distance from the first fold, the second tuning bar is located a second distance from the second fold, and wherein the first distance and the second distance are the same.

In some embodiments, the second portion of the first side of the radiating element is terminated with a first terminating impedance and the second portion of the second side is terminated with a second terminating impedance.

In accordance with some embodiments of the present disclosure, a second example method is provided. This method may comprise: providing a folded dipole antenna, wherein the folded dipole antenna comprises: a radiating element comprised of a first side and a second side; a RF feed located between the first side of the radiating element and the second side of the radiating element; wherein the first side of the radiating element is comprised of a first portion of the first side, a second portion of the first side, and a first fold between the first portion of the first side and the second portion of the first side; wherein the second side of the radiating element is comprised of a first portion of the second side, a second portion of the second side, and a second fold between the first portion of the second side and the second portion of the second side; wherein the first portion of the first side and the first portion of the second side have a first diameter, the second portion of the first side and the second portion of the second side have a second diameter, and the first diameter is different than the second diameter; a first tuning bar located between the first portion of the first side and the second portion of the first side; a second tuning bar located between the first portion of the second side and the second portion of the second side; receiving a first electromagnetic signal with the folded dipole antenna; generating a first signal with the folded dipole antenna based on the first electromagnetic signal; and transmitting the first signal via the RF feed.

In some embodiments, the first tuning bar is comprised of a first stub of the first tuning bar and a second stub of the first tuning bar separate by a first stub gap; and wherein second tuning bar is comprised of a first stub of the second tuning bar and a second stub of the second tuning bar separate by a second stub gap.

In some embodiments, the first tuning bar has a third diameter, the second tuning bar has a fourth diameter, and the third diameter is different than the fourth diameter.

In some embodiments, the first tuning bar is located a first distance from the first fold, the second tuning bar is located a second distance from the second fold, and wherein the first distance and the second distance are the same.

In some embodiments, the second portion of the first side of the radiating element is terminated with a first terminating impedance and the second portion of the second side is terminated with a second terminating impedance.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
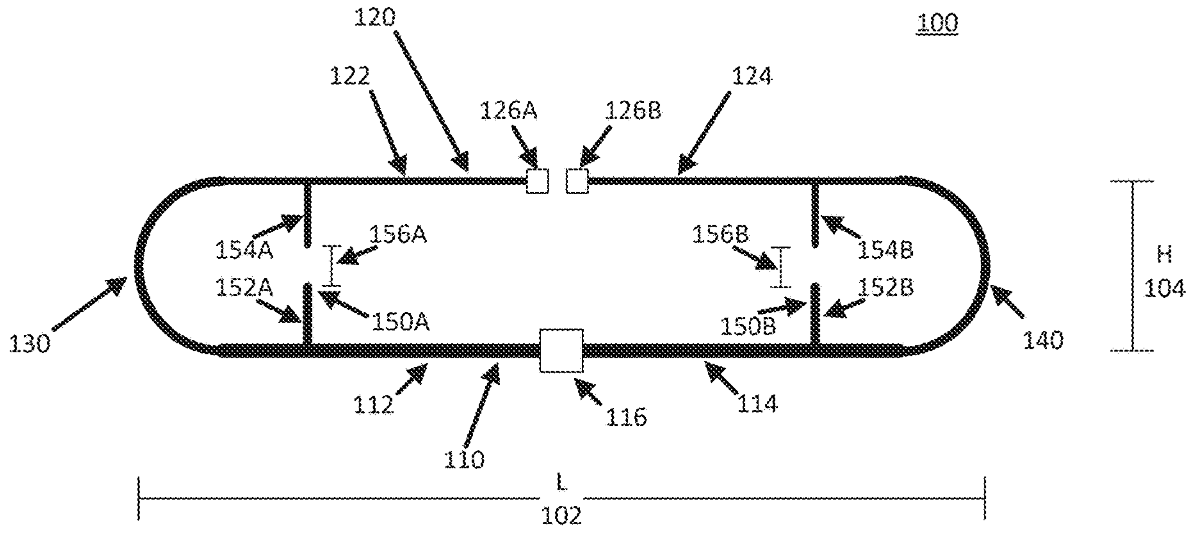
Figure 2:
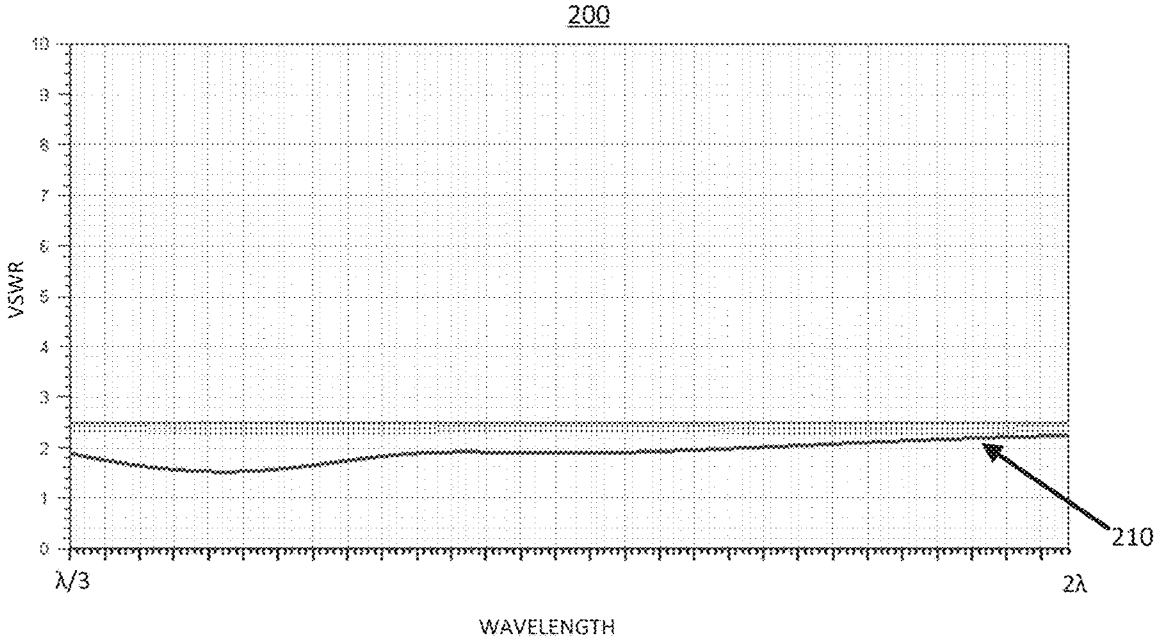
Figure 3:
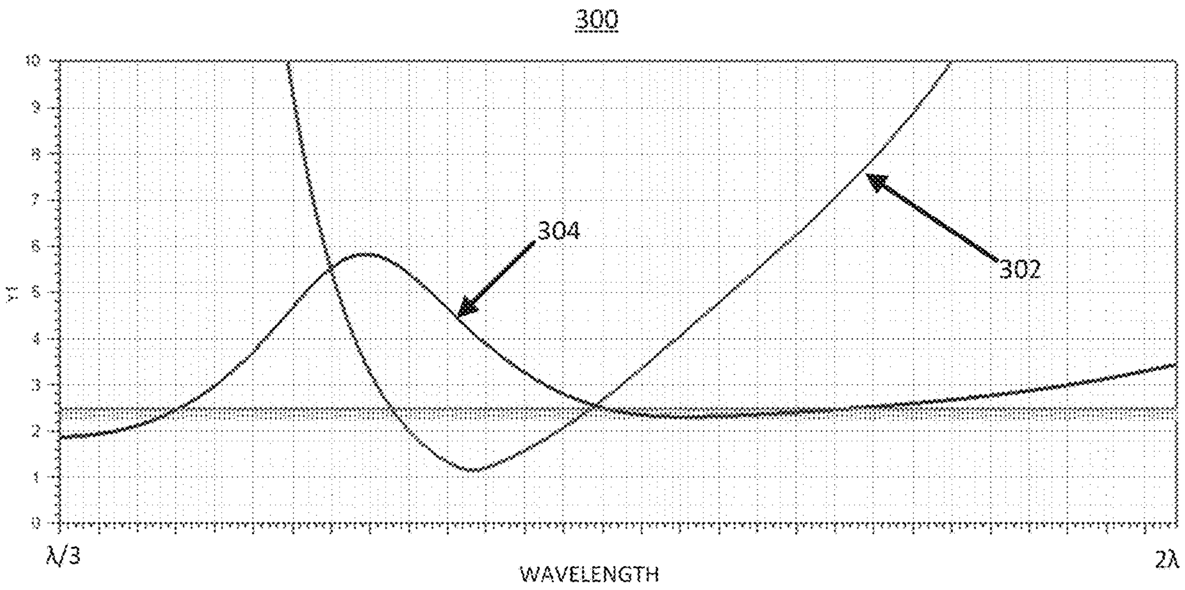
Figure 4:
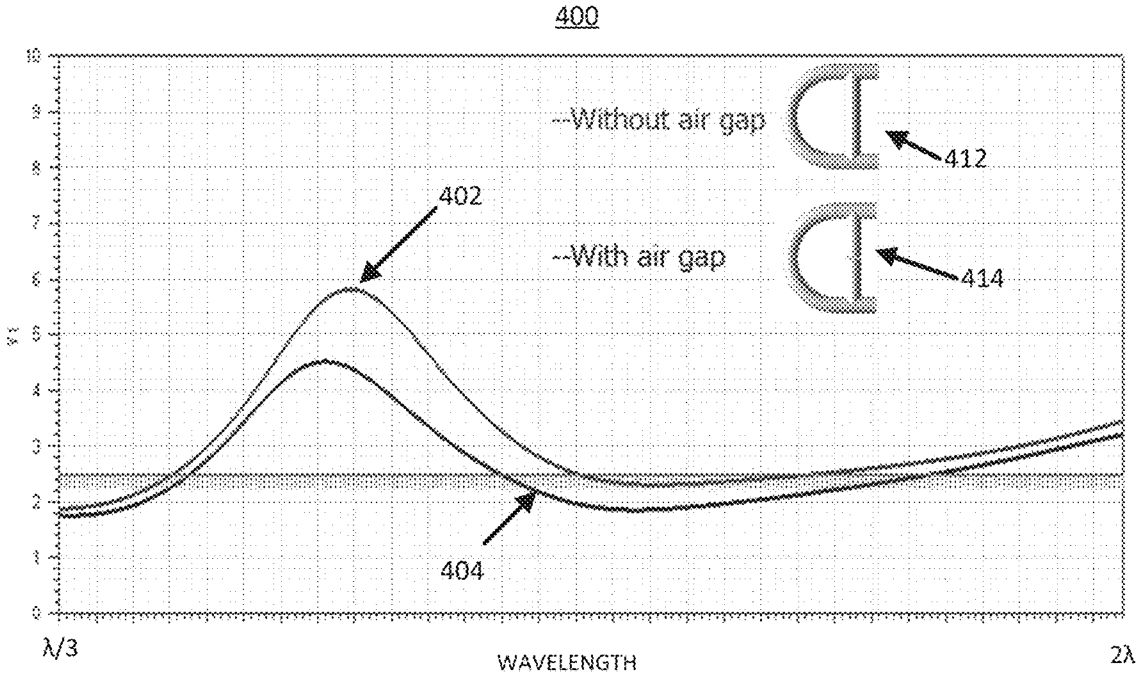
Figure 5:
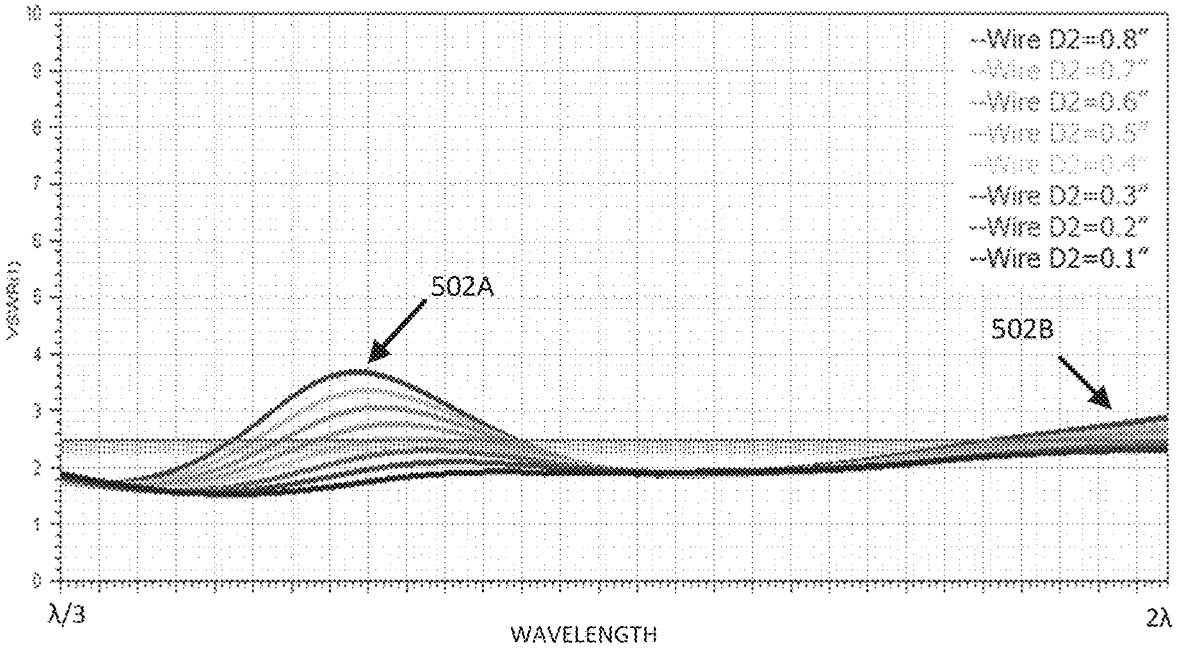
Figure 6A:
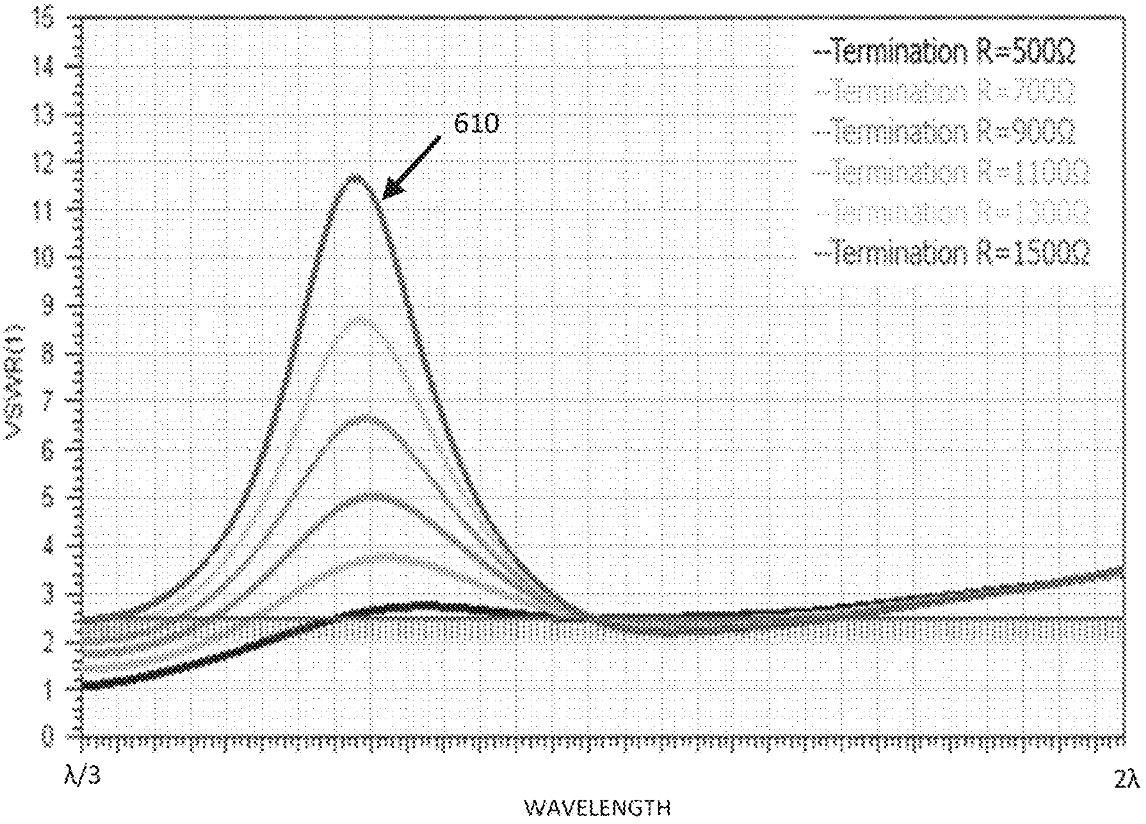
Figure 6B:
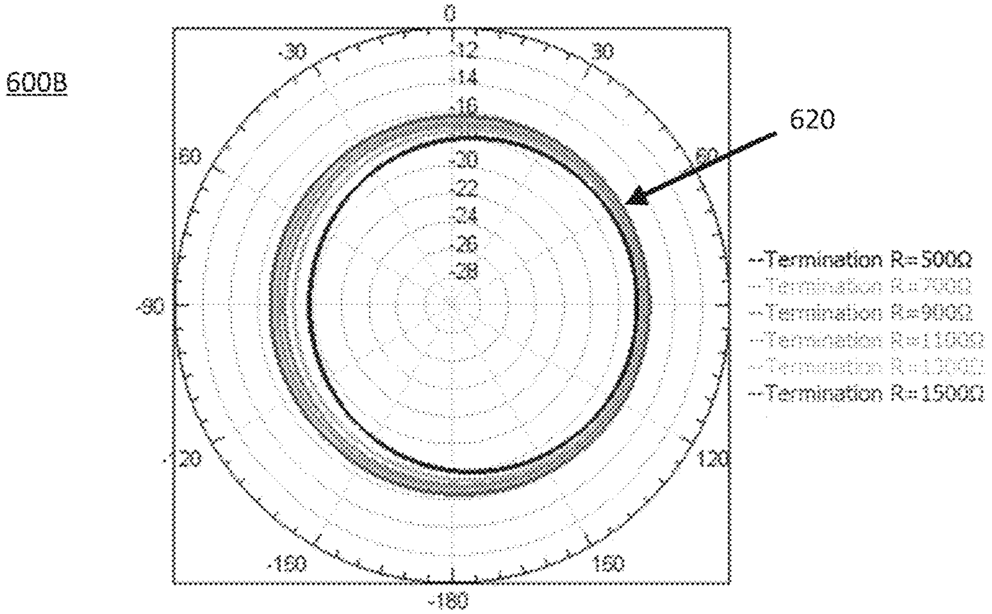
Figure 6C:
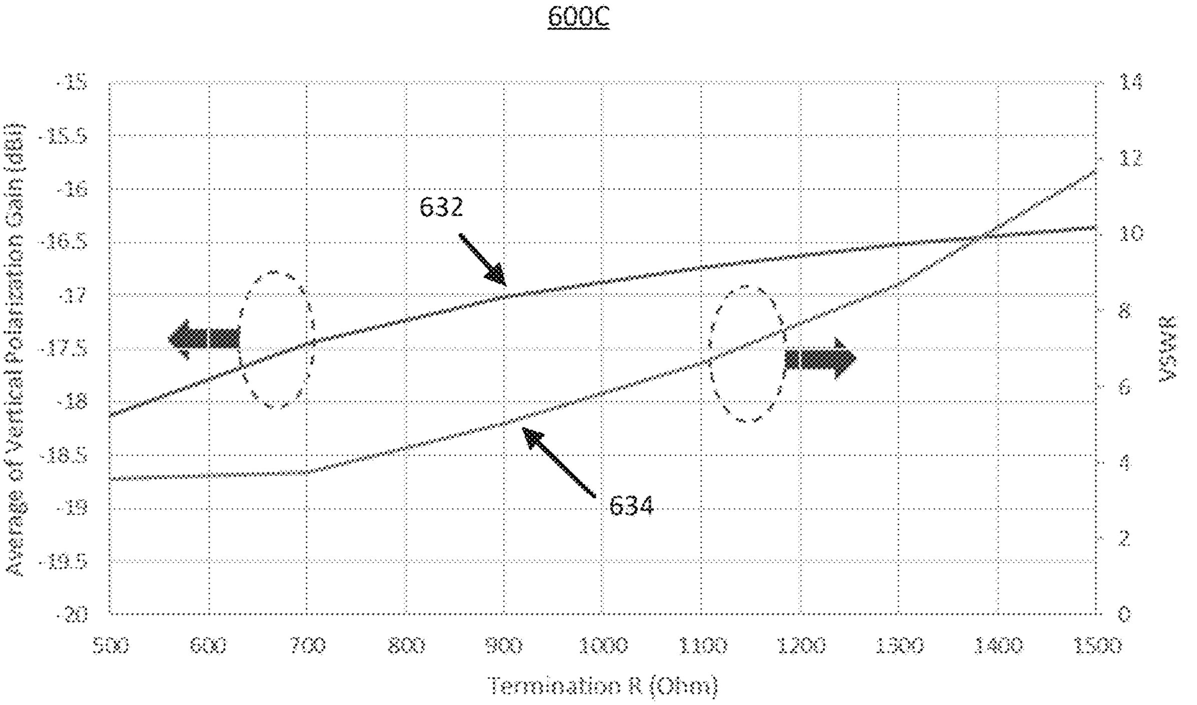
Figure 7:
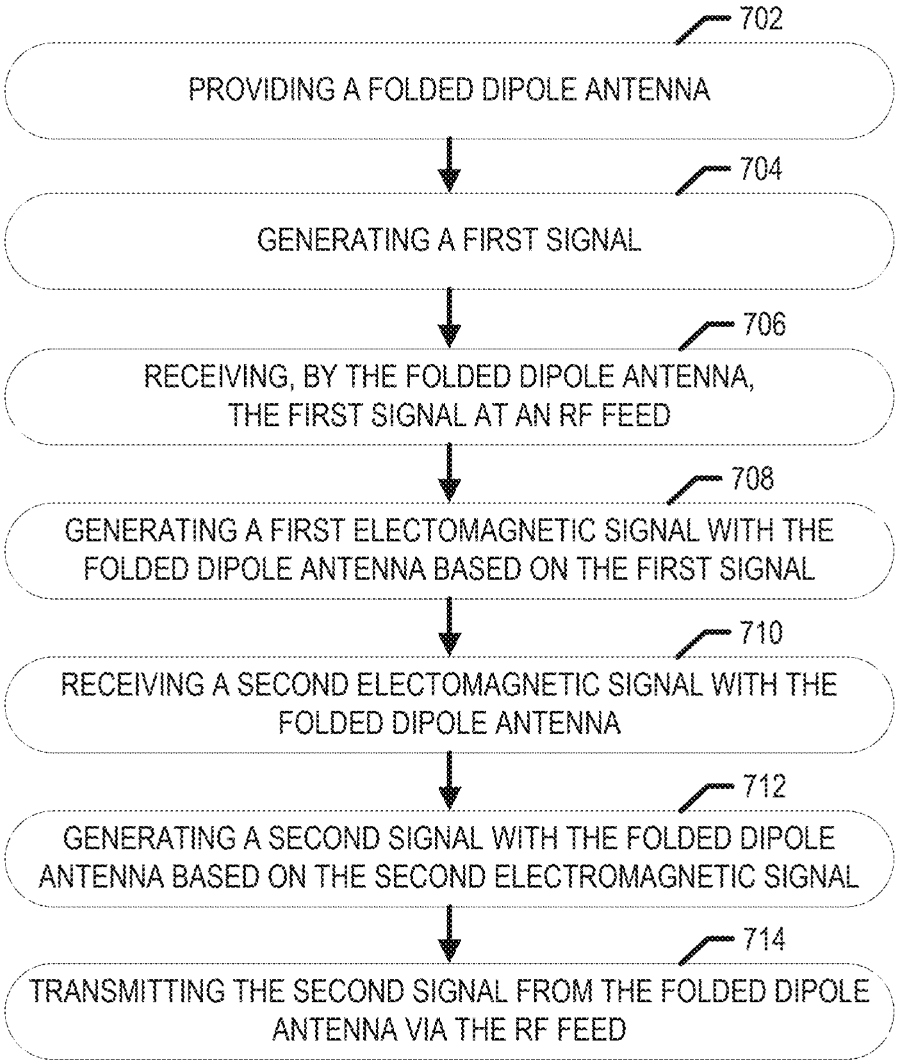
Figure 8:
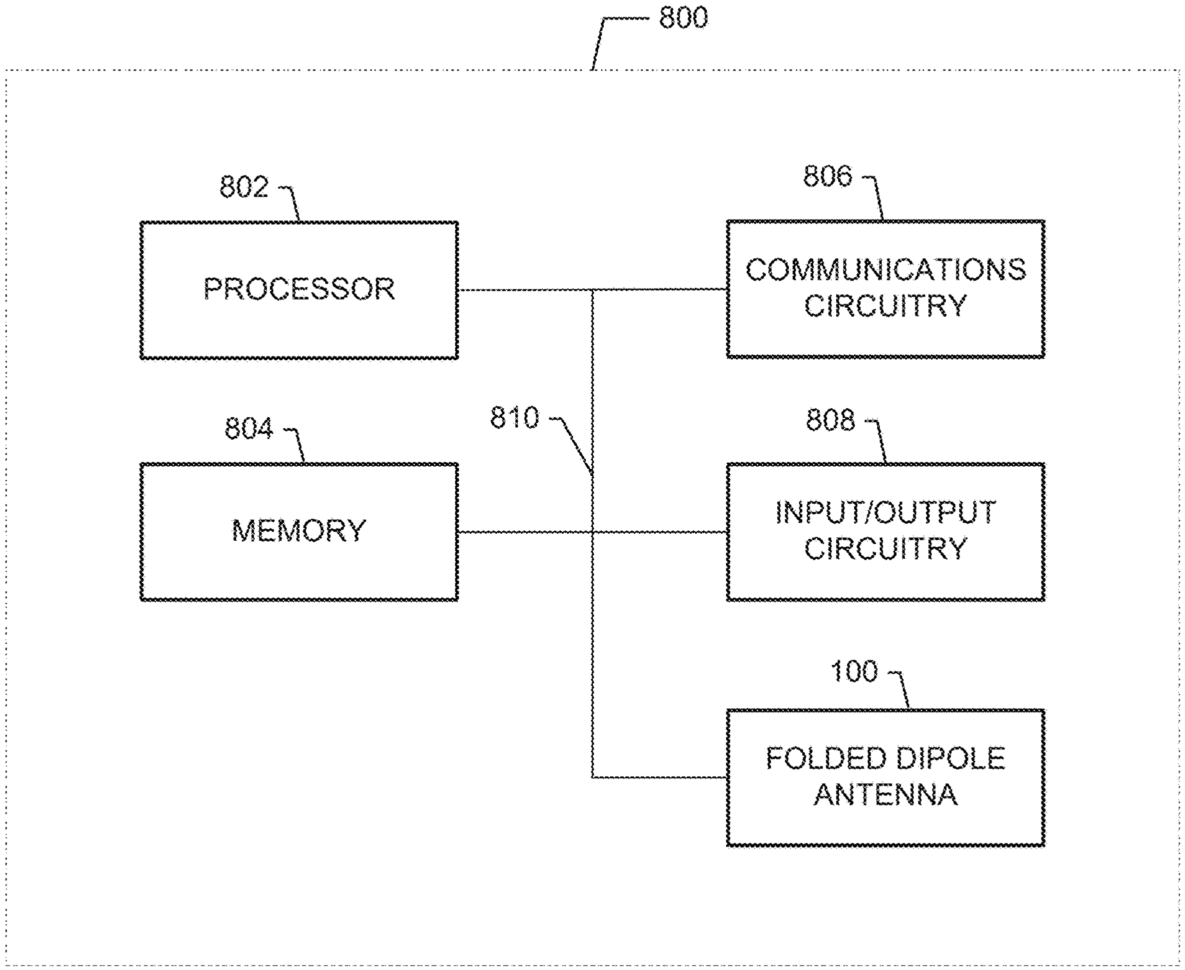

Having thus described certain example embodiments of the present disclosure in general terms, reference will now be made to the accompanying drawings, which are not necessarily drawn to scale, and wherein:

FIG. 1 illustrates an example folded dipole antenna in accordance with one or more embodiments of the present disclosure;

FIG. 2 illustrates an example graph of voltage standing wave ratio (VSWR) in accordance with one or more embodiments of the present disclosure;

FIG. 3 illustrates an example graph of a comparison of VSWR performance for example embodiments with and without termination resistance in accordance with one or more embodiments of the present disclosure;

FIG. 4 illustrates an example graph of a comparison of VSWR performance for example embodiments with and without an air gap in tuning bars in accordance with one or more embodiments of the present disclosure;

FIG. 5 illustrates an example graph of a comparison of VSWR performance for example embodiments with different diameters in accordance with one or more embodiments of the present disclosure;

FIG. 6A illustrates example graph of a comparison of VSWR performance for example embodiments with different termination resistances in accordance with one or more embodiments of the present disclosure;

FIG. 6B illustrates example polar graph of a comparison of VSWR performance for example embodiments with different termination resistances in accordance with one or more embodiments of the present disclosure;

FIG. 6C illustrates an example graph of a comparison of VSWR and average gain versus termination resistance in accordance with one or more embodiments of the present disclosure;

FIG. 7 illustrates an exemplary flowchart of a set of operations in accordance with one or more embodiments of the present disclosure; and FIG. 8 illustrates an exemplary device in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term “circuitry” should be understood broadly to include hardware and, in some embodiments, software for configuring the hardware. For example, in some embodiments, “circuitry” may include processing circuitry, communications circuitry, input/output circuitry, and the like. In some embodiments, other elements may provide or supplement the functionality of particular circuitry.

Overview

Various embodiments of the present disclosure are directed to improved dipole antennas, particularly to various embodiments of folded dipole antennas.

Dipole antennas may be used in a variety of applications to transmit and receive signals at various frequencies. In various applications, the application may limit the physical size of a dipole antenna. With conventional dipole antennas such limitations may require a conventional dipole antenna in such applications, or a system or apparatus utilizing a conventional dipole antenna, to be lossy. For example, limitations on size of a conventional dipole antenna may cause the shape and size of the conventional dipole antenna to be lossy or allow for limited ability to tune the conventional dipole antenna. Additionally or alternatively, one or more electrical circuits connected to the conventional dipole antenna to provide and/or receive a signal may be limited in their ability to match the impedance of the conventional dipole antenna.

The present disclosure describes an improved dipole antenna that may be used in a variety of applications. In various embodiments, the dipole antenna of the present disclosure is a folder dipole antenna. The folded dipole antenna may receive and/or transmit a signal via a RF feed located in the middle of one side of the folded dipole antenna. The folded dipole antenna may generally be considered a wire that may have two folds. A first fold may be a first end and a second fold may be at a second end. In this manner, the folded dipole antenna has both ends of the dipole antenna folded, such as an end being folded over on another portion of the dipole antenna. In various embodiments, at or through each fold is where a diameter of the dipole antenna may change or may be reduced in diameter from where a RF feed is located to where each end of the dipole antenna is located. An end, or each end, of the dipole antenna may be terminated with a termination resistor.

In various embodiments, the folded dipole antenna may include one or more tuning bars located a first distance from a fold. A tuning bar may be solid tuning bar with a single diameter and, thus, may not include an air gap. Alternatively, a tuning bar may be comprised of a first tuning bar portion of a first stub and a second tuning bar portion of a second stub that are separate by a gap. In various embodiments the gap may be an air gap. Alternatively or additionally, the gap may be filled with one or more dielectric materials. Various embodiments may include two tuning bars. Various embodiments may include three tuning bars. In various embodiments, multiple tunings bars may be located on a first on a first side of the radiating element of a folded dipole antenna (e.g., the left side of FIG. 1) and the same number or a different number of tuning bars may be located on the second side of the radiating element of the folded dipole antenna (e.g., the right side of FIG. 1). The one or more tuning bars may allow for improved tuning of the folded dipole antenna.

FIG. 1 illustrates an example folded dipole antenna in accordance with one or more embodiments of the present disclosure.

The folded dipole antenna 100 has a first dimension of a length L 102 and a second dimensions of a height H 104. In various embodiments the length and height of the folded dipole antenna 100 may be limited and, thus, the folded dipole antenna may have one or more portions folded over on itself. For example, various embodiments may have a length L 102 of 64" and a height H 104 of 5.75". The length L 102 and height H 104 may be a distance one or more portions of the folded dipole antenna 100 may be separated.

The folded dipole antenna may have a RF feed 116 on the first side. The RF feed 116 may be located in the center of the folded dipole antenna 100 or may be offset to one side or another. The RF feed 116 may be where the folded dipole antenna 100 receives and/or transmits one or more signals from a device, apparatus, or system utilizing the folded dipole antenna 100. For example, the RF feed 116 is where a current and/or signal may be provided.

The folded dipole antenna 100 may include a radiating element 110. The radiating element 110 may have two sides, and each side may extend from the RF feed 116 and end in a termination 126 (e.g., 126A, 126B), which may be with a termination resistor, termination impedance, or terminate without a termination resistor or termination impedance. The radiating element 110 may be comprised of a wire or a plurality of wires that vary in diameter or size from the RF feed 116 to the end of the respective side of the folded dipole antenna 100. Each end of a side of the folded dipole antenna 100 may be terminated with a termination resistor and/or termination impedance.

The termination resistor and/or impedance may be varied between embodiments. For example, a termination may be 1 kΩ. As another example, a termination impedance may include a resistor and/or additional electrical components (e.g., capacitor, inductor, etc.) that provide a complex impedance. In various embodiments, adjusting the terminating impedance may allow for tuning of the folded dipole antenna. Alternatively or additionally, various embodiments may not have a termination resistor and/or termination impedance.

As illustrated, the radiating element 110 of the folded dipole antenna 100 may include a first side that begins at the RF feed 116 and includes a first portion 112 of the first side, a second portion 122 of the first side, and a first fold 130 connecting the first portion 112 of the first side and the second portion 122 of the first side. The radiating element 110 may also include a second side that begins at the RF feed 116 and includes a first portion 114 of the second side, a second portion 124 of the second side, and a second fold 140 connecting the first portion 114 of the second side and the second portion 124 of the second side.

For each side, the radiating element may change in diameter from the RF feed 116 to the respective termination 126. In various embodiments, the first side of the radiating element 110 may include a first portion 112 having a first diameter, a first fold 130 having a second diameter, and a second portion 122 having a third diameter. In various embodiments, each side may be comprised of one or more wires which may be of different diameters.

Alternatively or additionally, the radiating element may have more than three diameters. For example, the diameter of the radiating element may continuously decrease and/or increase in diameter size along the length of a side of the radiating element. The different diameters may allow for the folded dipole antenna 100 to be configured for a specified tune of one or more parameters that may be varied, such as described herein.

As a current and/or a signal flows through the different diameters an electromagnetic field is generated to transmit an electromagnetic signal. Similarly, a received electromagnetic signal generates a current in the different diameters that may be transmitted through the RF feed 116 to a device, apparatus, or system utilizing the folded dipole antenna 100.

In various embodiments, the folded dipole antenna 100 may also include one or more tuning bars 150 (e.g., 150A, 150B). In various embodiments, a folded dipole antenna 100 may include a first tuning bar 150A and a second tuning bar 150B. The first tuning bar 150A may be located a first distance from the first fold 130. The second tuning bar 140 may be located a second distance from the second folder 140. These first distance and second distance may be the same or may be different. In various embodiments, the position of the tuning bar(s) 150 allow for a folded dipole antenna 100 to be configured with an improved VSWR with impedance matching due to current and/or capacitance along the circuit. In various embodiments, this may change with the frequency of a current and/or signal being applied or generated with the folded dipole antenna 100.

The first tuning bar 150A may be comprised of a first stub 152A and a second stub 254A. The first stub 152A and the second stub 154A of the first tuning bar 150A may be separated by a first stub gap 156A. In various embodiments the first stub gap 156A may be an air gap. Alternatively or additionally, the first stub gap 156A may be filled with one or more dielectric materials.

The second tuning bar 150B may also be comprised of a first stub 152B and a second stub 154B. The first stub 152B and the second stub 154B of the second tuning bar 150B may be separated by a second stub gap 156B. In various embodiments the second stub gap 156B may be an air gap. Alternatively or additionally, the second stub gap 156B may be filled with one or more dielectric materials. In various embodiments, the stub gap 156 of a tuning bar 150 may allow for the tuning bar 150 to act like a capacitor. A tuning bar 150 may be configured to adjust the impedance of the folded dipole antenna 100. For example, one or more tuning bars 150 may allow for, among other things, improved gain and improved response.

In various embodiments, the stub gap 156 of a tuning bar 150 may be located such that each of the first stub 152 and second stub 154 are of equal length. Alternatively, the stub gap 156 may be offset from center such that the first stub 152 and second stub 154 are of different lengths. In various embodiments, a first stub 152 may be of a first diameter and a second stub 154 may be of a second diameter, and these diameters may be the same or different. In various embodiments, the first tuning stub 152 and the second tuning stub 154 may have a shared axis of their respective diameters. Alternatively, the first tuning stub 152 and the second tuning stub 154 of a tuning bar 150 may be off axis from each other such that there is an offset. The tuning stubs being located on-axis or off-axis may allow for the folded dipole antenna 100 to be configured with a tuning of a desired impedance.

In various embodiments, a tuning bar 150 may not include a stub gap 156. Thus the tuning bar may be, for example, one length of wire. This length of wire may be of a diameter that is the same or different from the diameter(s) of the radiating element 110.

FIG. 2 illustrates an example graph of voltage standing wave ratio (VSWR) in accordance with one or more embodiments of the present disclosure. In the graph of FIG. 2 for an exemplary embodiment of the folded dipole antenna, a VSWR from $\lambda/3$ to $2\lambda$ is illustrated. As illustrated, a VSWR of less than 2.5:1 is obtained across this wavelength range. In the exemplary embodiment for this graph, the folded dipole antenna 100 is configured with a matching impedance of 275-j100Ω for termination impedances 126A, 126B. This VSWR is not only an acceptable range but also an improvement in VSWR over such a wavelength range for many applications.

Various embodiments of the folded dipole antenna 100 may be configured in different ways, including but not limited to the ways described in association with various figures.

FIG. 3 illustrates an example graph of a comparison of VSWR performance for example embodiments with and without termination resistance in accordance with one or more embodiments of the present disclosure. In comparison of two exemplary embodiments, a first embodiment for this comparison with a VSWR response 302 is compared to a second embodiment for this comparison with a VSWR response 304. The first embodiment with a VSWR response 302 does not include termination resistors or termination impedances 126. In comparison, the second embodiment with a VSWR response 304 includes using termination resistors 126 (e.g., 126A, 126B). In the second embodiment with a VSWR response 304, a 1 kΩ termination resistance is used. The graph illustrates, among other things, how a variation in termination and/or termination impedance may vary a VSWR response for configurations of the folded dipole antenna 100.

FIG. 4 illustrates an example graph of a comparison of VSWR performance for example embodiments with and without an air gap in tuning bars in accordance with one or more embodiments of the present disclosure. In comparison of two additional exemplary embodiments, a first embodiment for this comparison with a VSWR response 402 is compared to a second embodiment for this comparison with a VSWR response 404. The first embodiment with a VSWR response 402 has tuning bars 150A, 150B that are solid tuning bars that do not include an air gap. In comparison, the second embodiment with a VSWR response 404 includes has tuning bars 150A, 150B that are comprised of a first tuning stub 152 and a second tuning stub 154 separated by an air gap. In the second embodiment for this comparison the VSWR response 404 is lower across the frequency range of the graph. The air gap may create shunt capacitance, which leads to the VSWR response 404 compared to the VSWR response 402 illustrated in the graph.

FIG. 5 illustrates an example graph of a comparison of VSWR performance for example embodiments with different diameters in accordance with one or more embodiments of the present disclosure. In comparison of additional exemplary embodiments, a first diameter of first portion 112 of the first side and the first portion of the second side 114 is kept the same while a second diameter (D2) of second portion 114 of the first side and the second portion 124 of the second side is varied. Eight variations of this second diameter (D2) are illustrated, which are 0.1", 0.2", 0.3", 0.4", 0.5", 0.6", 0.7", and 0.8". While the second diameter is varied, the first diameter is held constant at 1.0". The VSWR responses for these variations in the second diameter (D2) are illustrated in the graph with the lowest VSWR response at graph portions 502A and 502B being the smallest diameter of D2 at 0.1" and the highest VSWR response at graph portions 502A and 502B being the largest second diameter 0.8". As is illustrated, as the second diameter (D2) increases, multiple portions of the VSWR response increase, specifically at the frequencies of portions 502A and 502B of the graph 500. As illustrated, an improvement of VSWR response is observed as the wire diameter is reduced.

In various embodiments, the first diameter may be greater than the second diameter. This may be due to the folded dipole antenna being configured with a larger first diameter to increase a power handling of the folded dipole antenna.

FIGS. 6A-6C illustrates different graphs all associated with comparing additional embodiments varying termination resistances. In comparison of additional exemplary embodiments, a termination resistance may be varied for each of the termination impedances 126A and 126B of a folded dipole antenna. Six variations of termination resistances are illustrated, which are for termination resistances of 500 ohms, 700 ohms, 900 ohms, 1,100 ohms, 1,300 ohms, and 1,500 ohms. Responses associated with these variations are illustrated in FIGS. 6A-6C.

FIG. 6A illustrates example graph of a comparison of VSWR performance for example embodiments with different termination resistances in accordance with one or more embodiments of the present disclosure. As is illustrated in FIG. 6A, a VSWR response for each of these variations changes as the frequency increases. The VSWR responses for each of these variations also increases in a first portion 610 of the graph and then the variation in VSWR responses decrease around 100 MHz. The variations around portion 610 include the lowest VSRWR response for the lowest resistance value and each variation in resistance value increases the VSWR response. Thus, at portion 610 of the graph, the lowest VSWR response is for a termination of 500 ohms, the second lowest is for a termination of 700 ohms, the third lowest is for a resistance of 900 ohms, the fourth lowest is for a resistance of 1,100 ohms, the fifth lowest is for a resistance of 1,300 ohms, and the highest VSWR response is for the resistance of 1,500 ohms. As illustrated for the configurations of these embodiments, a lower VSWR response is observed for a lower termination resistance.

FIG. 6B illustrates example polar graph of a comparison of VSWR performance for example embodiments with different termination resistances in accordance with one or more embodiments of the present disclosure. The polar graph of FIG. 6B illustrates the antenna gain at 30 MHz for varied termination resistances. The illustrated antenna gains 620 for illustrate that the gain 100 of the folded dipole antenna 100 increases as the termination resistance increases. On the 0-degree axis, the variations include the gain of lowest termination resistance of 500 ohms resulting in the lowest gain of just under-18 dB of gain with gain increasing until the highest gain with the termination resistance of 1,500 ohms variation at just under-16 dB. As illustrated for the configurations of these embodiments, a higher gain is observed for a higher termination resistance.

FIG. 6C illustrates an example graph of a comparison of VSWR and average gain versus termination resistance in accordance with one or more embodiments of the present disclosure. Thus FIG. 6C illustrates what is in the graph of FIG. 6A and the graph of FIG. 6B in another format. FIG. 6C includes the variations at a frequency of 30 MHz.

FIG. 6C graphs the VSWR response 632 for variations in the termination resistance. As illustrated by the VSWR response 632, the VSWR increases with higher termination resistances. Thus, for such embodiments, a VSWR response may be improved with lower termination resistances.

FIG. 6C also graphs the average of vertical polarization gain (dBi) (for if the folded dipole antenna is in a vertical configuration) with graph 634 for variations in the termination resistance. As illustrated by the graph 634, the average of vertical polarization gain increases with higher termination resistances. Thus, for such embodiments, gain may be improved with higher termination resistances. In the embodiments with variations illustrated in the graphs of FIG. 6C, the VSWR response and polarization gain performance are inversely correlated to the termination resistance.

FIG. 7 illustrates an exemplary flowchart of a set of operations in accordance with one or more embodiments of the present disclosure. As will be appreciated, the operations describe both transmitting a electromagnetic signal with a folded dipole antenna and receiving an electromagnetic signal with a folded dipole antenna. While all of the operations are illustrated in one flowchart, it will be appreciated that certain operations may be performed separately, such as to either transmit a signal or receive a signal.

At operation 702, provide a folded dipole antenna. A device, apparatus, or system may utilize one or more folded dipole antennas 100. Thus the device, apparatus, or system may be provided a folded dipole antenna 100, such as described herein.

At operation 704, generate a first signal. A first signal may be generated by a device, apparatus, or system, such as with a processor. The first signal may be associated with data that is desired to be transmitted via the folded dipole antenna 100. The first signal may be generated transmitted to the folded dipole antenna 100.

At operation 706, receive, by the folded dipole antenna, the first signal at a RF feed. The folded dipole antenna 100 may receive the first signal via the RF feed 116. The RF feed 116 may receive the first signal and the first signal may be passed to the radiating element 110.

At operation 708, generate a first electromagnetic signal with the folded dipole antenna based on the first signal. A first electromagnetic signal may be generated by the radiating element 100 as the first signal is transmitted through the radiating element 100. The first electromagnetic signal may have a radiation pattern that is transmitted away from the folded dipole antenna 100. As described herein, the efficiency of the folded dipole antenna 100 in generating the first electromagnetic field may be improved for one or more frequencies by configuring the folded dipole antenna 100 as described herein, including according to various variations described herein.

At operation 710, receiving a second electromagnetic signal with the folded dipole antenna. A second electromagnetic signal may be received by the folded dipole antenna 100 from a remote transmission source.

At operation 712, generating a second signal with the folded dipole antenna based on the second electromagnetic signal. The radiating element 110 of the folded dipole antenna 100 may generate a second signal or current based on the second electromagnetic signal.

At operation 714, transmitting the second signal from the folded dipole antenna via the RF feed. The RF feed 116 may transmit the second signal generated by the folded dipole antenna in response to the second electromagnetic signal to one or more other components or portions of a device, apparatus, or system that the folded dipole antenna 100 is provided in.

FIG. 8 illustrates an exemplary device in accordance with one or more embodiments of the present disclosure. The device 800 illustrated may be an apparatus and/or system that includes processor 802, memory 804, communications circuitry 806, and input/output circuitry 808, folded dipole antenna 812, which may all be connected via a bus 810. The folded dipole antenna 100 may be as described herein.

The processor 802, although illustrated as a single block, may be comprised of a plurality of components and/or processor circuitry. The processor 802 may be implemented as, for example, various components comprising one or a plurality of die, flip chips, microprocessors, processing circuits; and various other processing elements. The processor 802 may include integrated circuits, such as ASICs, FPGAs, systems-on-a-chip (SoC), or combinations thereof. In various embodiments, the processor 802 may be configured to execute operations, instructions, applications, and/or programs stored in the processor 802, memory 804, or otherwise accessible to the processor 802. When executed by the processor 802, these operations, instructions, applications, and/or programs may enable the execution of one or a plurality of the operations and/or functions described herein. Regardless of whether a processor 802 is configured by hardware, firmware/software methods, or a combination thereof, the processor 802 may comprise entities capable of executing operations and/or functions according to the embodiments of the present disclosure when correspondingly configured.

The memory 804 may comprise, for example, a volatile memory, a non-volatile memory, or a certain combination thereof. Although illustrated as a single block, the memory 804 may comprise a plurality of memory components. In various embodiments, the memory 804 may comprise, for example, a cache memory, random access memory, a flash memory, a hard disk, a circuit configured to store information, or a combination thereof. The memory 804 may be configured to write or store data, information, application programs, instructions, etc. so that the processor 802 may execute various operations and/or functions according to the embodiments of the present disclosure. Additionally or alternatively, in at least some embodiments, the memory 804 may be configured to store program instructions for execution by the processor 802. The memory 804 may store information in the form of static and/or dynamic information. When the operations and/or functions are executed, the stored information may be stored and/or used by the processor 802.

The communication circuitry 806 may be implemented as any apparatus included in a circuit, hardware, computer program product, or a combination thereof, which is configured to receive and/or transmit data from/to another component or apparatus. The computer program product may comprise computer-readable program instructions stored on a computer-readable medium (e.g., memory 804) and executed by a processor 802. In various embodiments, the communication circuitry 806 (as with other components discussed herein) may be at least partially implemented as part of the processor 802 or otherwise controlled by the processor 802. The communication circuitry 806 may communicate with the processor 802, for example, through a bus 810. Such a bus may connect to the processor 802, and it may also connect to one or more other components. The communication circuitry may be comprised of, for example, transmitters, receivers, transceivers, network interface cards and/or supporting hardware and/or firmware/software, and may be used for establishing communication with another component(s), apparatus(es), and/or system(s). The communication circuitry 806 may be configured to receive and/or transmit data that may be stored by, for example, the memory 804 by using one or more protocols that can be used for communication between components, apparatuses, and/or systems.

In various embodiments, the communication circuitry 806 may convert, transform, and/or package data into data packets and/or data objects to be transmitted and/or convert, transform, and/or unpackage data received, such as from a first protocol to a second protocol, from a first data type to a second data type, from an analog signal to a digital signal, from a digital signal to an analog signal, or the like. The communication circuitry 806 may additionally, or alternatively, communicate with the memory 804, the input/output circuitry 808, and/or any other component of the processor 802, such as through a bus 810.

The input/output circuitry 808 may communicate with the processor 802 to receive instructions input by an operator and/or to provide outputs to an operator, which may be through one or more other portions of an apparatus or system. The input/output circuitry 808 may comprise one or more interfaces to which one or more other portions of an apparatus or system or supporting devices may be connected. In various embodiments, aspects of the input/output circuitry 808 may be implemented on a device used by the operator to communicate with the processor 802. The input/output circuitry 808 may communicate with the memory 804, the communication circuitry 806, and/or any other component, for example, through a bus 810.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

In various embodiments, the device 800 may be an apparatus of a portion of a larger system. For example, in various embodiments the folded dipole antenna 100 may be included in, such as mounted or embedded in, a device 800 that is incorporated into an aircraft or helicopter, such as in the tail area of an aircraft or helicopter. In such a tail area the folded dipole antenna 100 may be mounted in a vertical configuration or, alternatively, a horizontal configuration. In a vertical configuration, for example, such a configuration may allow for an omnidirectional radiation pattern in a 360-degree azimuth plane. In various embodiments, one or more portions of the device 800 may include the folded dipole antenna 100 included on a printed circuit board that also include a lumped element matching network that may be used to transmit and/or receive signals to and from the RF feed 116 of the folded dipole antenna 100.

It should be readily appreciated that the embodiments of the systems and apparatuses, described herein may be configured in various additional and alternative manners in addition to those expressly described herein.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this detailed description has set forth some embodiments of the present invention, the appended claims cover other embodiments of the present invention which differ from the described embodiments according to various modifications and improvements.

Within the appended claims, unless the specific term "means for" or "step for" is used within a given claim, it is not intended that the claim be interpreted under 35 U.S.C. § 112, paragraph 6.

The invention claimed is:

1. A folded dipole antenna comprising:

a radiating element comprised of a first side and a second side;

a RF feed located between the first side of the radiating element and the second side of the radiating element;

wherein the first side of the radiating element is comprised of a first portion of the first side having a first length, a second portion of the first side having a second length, and a first fold having a first fold length between the first portion of the first side and the second portion of the first side;

wherein the second side of the radiating element is comprised of a first portion of the second side having a third length, a second portion of the second side having a fourth length, and a second fold having a second fold length between the first portion of the second side and the second portion of the second side;

wherein the first portion of the first side has a first diameter for the first length, and wherein the first portion of the second side has the first diameter for the second length;

wherein the second portion of the first side has a second diameter for the second length, and wherein the second portion of the second side has the second diameter for the fourth length, and wherein the first diameter is different than the second diameter;

wherein the first fold has a fifth diameter for the first fold length and wherein the second fold has a sixth diameter for the second fold length;

a first tuning bar located between the first portion of the first side and the second portion of the first side; and a second tuning bar located between the first portion of the second side and the second portion of the second side.

2. The folded dipole antenna of claim 1, wherein the first tuning bar is comprised of a first stub of the first tuning bar and a second stub of the first tuning bar separate by a first stub gap; and wherein second tuning bar is comprised of a first stub of the second tuning bar and a second stub of the second tuning bar separate by a second stub gap.

3. The folded dipole antenna of claim 2, wherein the first stub of the first tuning bar and the second stub of the first tuning bar share an axis, and the first stub of the second tuning bar and the second stub of the second tuning bar share an axis.

4. The folded dipole antenna of claim 2, wherein the first stub of the first tuning bar has a first central axis and the second stub of the first tuning bar has a second central axis, the first central axis being different than the second central axis.

5. The folded dipole antenna of claim 1, wherein the first tuning bar is a solid tuning bar, and the second tuning bar is a solid tuning bar.

6. The folded dipole antenna of claim 1, wherein the first tuning bar has a third diameter, the second tuning bar has a fourth diameter, and the third diameter is different than the fourth diameter.

7. The folded dipole antenna of claim 1, wherein the first tuning bar is located a first distance from the first fold, the second tuning bar is located a second distance from the second fold, and wherein the first distance and the second distance are the same.

8. The folded dipole antenna of claim 1, wherein the first tuning bar is located a first distance from the first fold, the second tuning bar is located a second distance from the second fold, and wherein the first distance and the second distance are different.

9. The folded dipole antenna of claim 1, wherein the second portion of the first side of the radiating element is terminated with a first terminating impedance and the second portion of the second side is terminated with a second terminating impedance.

10. The folded dipole antenna of claim 1 further comprising a third tuning bar.

11. A method comprising:

providing a folded dipole antenna, wherein the folded dipole antenna comprises:

a radiating element comprised of a first side and a second side;

a RF feed located between the first side of the radiating element and the second side of the radiating element;

wherein the first side of the radiating element is comprised of a first portion of the first side having a first length, a second portion of the first side having a second length, and a first fold having a first fold length between the first portion of the first side and the second portion of the first side;

wherein the second side of the radiating element is comprised of a first portion of the second side having a third length, a second portion of the second side having a fourth length, and a second fold having a second fold length between the first portion of the second side and the second portion of the second side;

wherein the first portion of the first side has a first diameter for the first length, and wherein the first portion of the second side has the first diameter for the second length;

the second portion of the first side has a second diameter for the second length, and wherein the second portion of the second side has the second diameter for the fourth length;

wherein the first diameter is different than the second diameter;

wherein the first fold has a fifth diameter for the first fold length and wherein the second fold has a sixth diameter for the second fold length;

a first tuning bar located between the first portion of the first side and the second portion of the first side;

a second tuning bar located between the first portion of the second side and the second portion of the second side;

receiving a first signal via the RF feed; and generating a first electromagnetic signal with the folded dipole antenna based on the first signal.

12. The method of claim 11, wherein the first tuning bar is comprised of a first stub of the first tuning bar and a second stub of the first tuning bar separate by a first stub gap; and wherein second tuning bar is comprised of a first stub of the second tuning bar and a second stub of the second tuning bar separate by a second stub gap.

13. The method of claim 11, wherein the first tuning bar has a third diameter, the second tuning bar has a fourth diameter, and the third diameter is different than the fourth diameter.

14. The method of claim 11, wherein the first tuning bar is located a first distance from the first fold, the second tuning bar is located a second distance from the second fold, and wherein the first distance and the second distance are the same.

15. The method of claim 11, wherein the second portion of the first side of the radiating element is terminated with a first terminating impedance and the second portion of the second side is terminated with a second terminating impedance.

16. A method comprising:

providing a folded dipole antenna, wherein the folded dipole antenna comprises:

a radiating element comprised of a first side and a second side;

a RF feed located between the first side of the radiating element and the second side of the radiating element;

wherein the first side of the radiating element is comprised of a first portion of the first side having a first length, a second portion of the first side having a second length, and a first fold having a first fold length between the first portion of the first side and the second portion of the first side;

wherein the second side of the radiating element is comprised of a first portion of the second side having a third length, a second portion of the second side having a fourth length, and a second fold having a second fold length between the first portion of the second side and the second portion of the second side;

wherein the first portion of the first side has a first diameter for the first length, and wherein the first portion of the second side has the first diameter for the second length;

wherein the second portion of the first side has a second diameter for the second length, and wherein the second portion of the second side has the second diameter for the fourth length;

wherein the first diameter is different than the second diameter;

wherein the first fold has a fifth diameter for the first fold length and wherein the second fold has a sixth diameter for the second fold length;

a first tuning bar located between the first portion of the first side and the second portion of the first side;

a second tuning bar located between the first portion of the second side and the second portion of the second side;

receiving a first electromagnetic signal with the folded dipole antenna;

generating a first signal with the folded dipole antenna based on the first electromagnetic signal; and transmitting the first signal via the RF feed.

17. The method of claim 16, wherein the first tuning bar is comprised of a first stub of the first tuning bar and a second stub of the first tuning bar separate by a first stub gap; and wherein second tuning bar is comprised of a first stub of the second tuning bar and a second stub of the second tuning bar separate by a second stub gap.

18. The method of claim 16, wherein the first tuning bar has a third diameter, the second tuning bar has a fourth diameter, and the third diameter is different than the fourth diameter.

19. The method of claim 16, wherein the first tuning bar is located a first distance from the first fold, the second tuning bar is located a second distance from the second fold, and wherein the first distance and the second distance are the same.

20. The method of claim 16, wherein the second portion of the first side of the radiating element is terminated with a first terminating impedance and the second portion of the second side is terminated with a second terminating impedance.

* * * * *